(12) United States Patent
Viernekes et al.

(10) Patent No.: US 11,916,463 B2
(45) Date of Patent: Feb. 27, 2024

(54) ARRANGEMENT FOR THE LIQUID COOLING OF AN ELECTRIC MACHINE

(71) Applicant: ZF FRIEDRICHSHAFEN AG, Friedrichshafen (DE)

(72) Inventors: Gerald Viernekes, Hassfurt (DE); Linus Eschenbeck, Wangen (DE); Christopher Allnoch, Kressbronn (DE); Florian Model, Eltmann (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 942 days.

(21) Appl. No.: 16/831,375

(22) Filed: Mar. 26, 2020

(65) Prior Publication Data

US 2020/0321827 A1 Oct. 8, 2020

(30) Foreign Application Priority Data

Apr. 4, 2019 (DE) ...................... 10 2019 204 815.3

(51) Int. Cl.
| | |
|---|---|
| H02K 5/20 | (2006.01) |
| H02K 7/00 | (2006.01) |
| H02K 9/19 | (2006.01) |
| B60K 6/24 | (2007.10) |
| B60K 6/26 | (2007.10) |
| B60K 6/36 | (2007.10) |
| B60K 11/02 | (2006.01) |
| B60K 1/00 | (2006.01) |

(52) U.S. Cl.
CPC ............... *H02K 7/006* (2013.01); *B60K 6/24* (2013.01); *B60K 6/26* (2013.01); *B60K 6/36* (2013.01); *B60K 11/02* (2013.01); *H02K 5/203* (2021.01); *H02K 9/19* (2013.01); *B60K 2001/006* (2013.01); *B60Y 2200/92* (2013.01)

(58) Field of Classification Search
CPC ................................. H02K 5/20; H02K 5/203
See application file for complete search history.

(56) References Cited

U.S. PATENT DOCUMENTS 3,060,335 A * 10/1962 Greenwald ............ H02K 5/203
                                                                310/58

FOREIGN PATENT DOCUMENTS

DE     102017203435         9/2018
WO     WO-2018175943 A1 *   9/2018    ............ F25B 31/006

* cited by examiner

*Primary Examiner* — Ramon M Barrera
(74) *Attorney, Agent, or Firm* — Cozen O'Connor

(57) ABSTRACT

An arrangement for liquid cooling of an electric machine with a stator and a rotor. The electric machine is enclosed over its outer circumference by a cooling jacket having an input and an output. In an installed position of the electric machine, the input is arranged spatially below a rotational axis of the rotor, and the output is arranged spatially above the rotational axis.

14 Claims, 5 Drawing Sheets

ARRANGEMENT FOR THE LIQUID COOLING OF AN ELECTRIC MACHINE

BACKGROUND OF INVENTION

1. Field of the Invention

The invention is directed to an arrangement for liquid cooling of an electric machine. The invention is further directed to an electric machine having such an arrangement and to a drive unit for a motor vehicle having such an electric machine.

2. Description of Related Art

Arrangements for the liquid cooling of electric machines are known from the prior art. German Patent Application DE 10 2017 203 435 A1 describes a cooling jacket component for a housing of an electric machine. The cooling jacket component comprises a tubular cooling jacket with an inlet connection piece and an outlet connection piece arranged at opposite ends of the cooling jacket. An arrangement of this kind increases the installation space requirement because corresponding connections must be provided for the inlet and outlet of the cooling jacket component.

SUMMARY OF THE INVENTION

It is an object of one aspect of the invention to provide liquid cooling for an electric machine having a good cooling effect and by a low installation space requirement.

An arrangement for the liquid cooling of an electric machine with a stator and a rotor is suggested as a solution to the above-stated problem. The electric machine is enclosed over its outer circumference by a cooling jacket. The cooling jacket has an input and an output. The cooling jacket guides liquid cooling medium from the input to the output so that heat can be transferred from the electric machine to the cooling medium. Subsequently, the cooling medium can flow through a heat exchanger so that heat can be transferred from the cooling medium to an environment or to another cooling medium. The cooling medium can circulate in a cooling circuit so that the cooling medium can be fed back to the electric machine again after flowing through the heat exchanger.

It is provided according to one aspect of the invention that in the installed position of the electric machine the input is arranged spatially below a rotational axis of the rotor and the output is arranged spatially above this rotational axis.

As a result of such a spatial separation between input and output of the cooling jacket, the circulation through the cooling jacket is carried out from the bottom to the top. Accordingly, an independent connection at the output can be dispensed with because cooling medium exiting at the output can collect in a sump area of a housing, which surrounds the electric machine. Additionally, a solution of this kind increases the thermal efficiency of the cooling arrangement.

The output is preferably arranged spatially at the uppermost point of the electric machine in the installed position. The thermal efficiency of the cooling arrangement is particularly increased by an arrangement of this kind because fluid exiting at the output can accordingly flow down via the entire electric machine.

Preferably, cooling medium exiting at the output flows down an outside of the cooling jacket at the electric machine. Owing to such an arrangement, the cooling medium exiting at the output comes in contact with the rotor. The cooling medium is swirled when the rotor rotates. This increases the thermal efficiency of the cooling arrangement.

According to a preferred embodiment, the output has at least two outlet openings. The two outlet openings are spaced apart from one another in axial direction. An arrangement of this kind benefits the flowing out of cooling medium on both end faces of the electric machine.

In the installed position of the electric machine, the input is preferably arranged spatially in the lower third or lower fourth of the electric machine and at a distance from the lowermost point of the electric machine. The width of the assembly of the electric machine with the cooling jacket is not increased by this configuration.

The input and output are preferably arranged at a distance from one another of at least one fourth, particularly preferably at least one third, of the circumference of the electric machine. A cooling of the electric machine, which is at least somewhat uniform, can be made possible by such an arrangement.

The cooling jacket is preferably formed such that cooling medium flowing in from the input is guided along both circumferential directions to the output. In other words, the cooling jacket has a first flow path and a second flow path. The first flow path leads from the input in a first direction along the outer circumference of the electric machine to the output. The second flow path leads from the input in a second direction along the outer circumference of the electric machine to the output. The first direction and second direction are oppositely oriented. An at least somewhat uniform cooling of the electric machine can be achieved by such an arrangement. The lengths of the two flow paths can differ from one another.

According to a preferred embodiment, the cooling jacket is formed by a stator carrier of the electric machine and a cover element that surrounds the stator carrier. By a construction of this kind, a component that is required in any case, i.e., the stator, can be used to form the cooling jacket. The number of parts required to form the cooling jacket can be reduced in this way.

The output of the cooling jacket is preferably formed by at least one, preferably two, openings formed in the stator carrier. Cooling medium can exit from these openings and accordingly arrive directly at the stator winding. The stator winding can be efficiently cooled in this way without being surrounded by the cooling jacket.

A divider configured to divide the cooling medium entering the input of the cooling jacket is preferably formed or arranged at the stator carrier. The divider can be flow guides such as panels, baffles, or the like. In this way, a uniform distribution of the entering cooling medium in the cooling jacket can be achieved.

The above-described arrangement for liquid cooling is preferably a component part of an electric machine. In other words, the arrangement together with the electromagnetically active elements of the electric machine can form a common constructional unit.

The electric machine with the above-described arrangement can be a component part of a drive unit for a motor vehicle. For example, the drive unit can be formed by a vehicle axle unit, by a transmission or by a hybrid module arranged between the internal combustion engine and the transmission. The transmission can be a multiple-step transmission or a stepless transmission.

BRIEF DESCRIPTION OF THE DRAWINGS

In the following, an embodiment example of the invention is described in detail in the figures.

DETAILED DESCRIPTION OF THE PRESENTLY PREFERRED EMBODIMENTS

Figure 1:
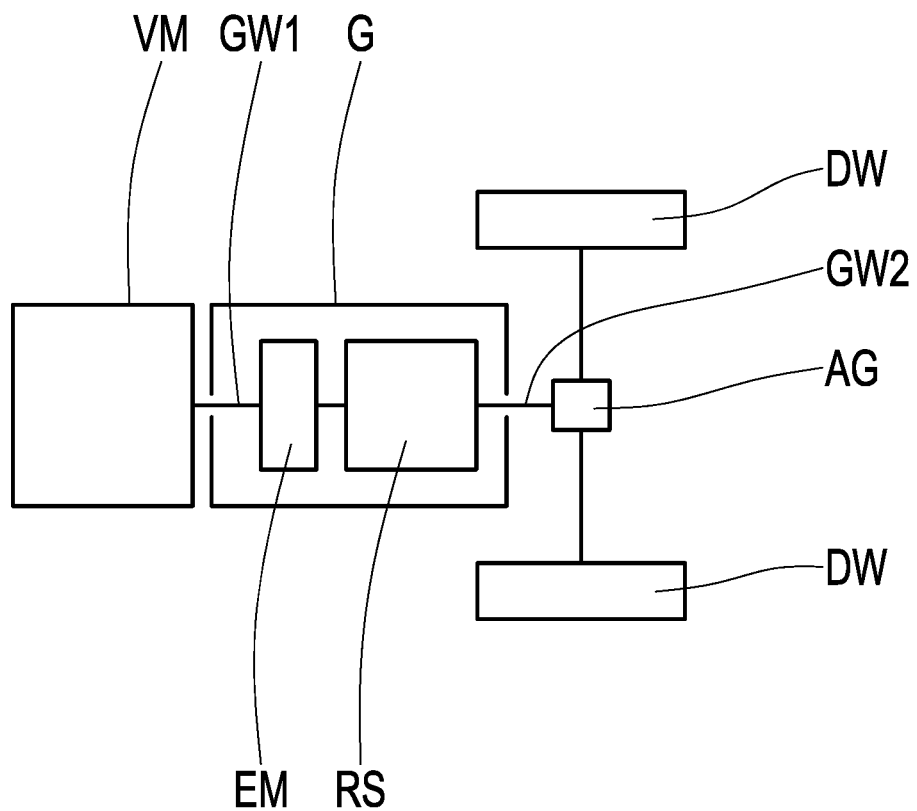
FIG. 1 to FIG. 3 are different powertrains for a motor vehicle.

FIG. 1 schematically shows a powertrain for a motor vehicle. The powertrain has an internal combustion engine VM, the output of which is connected to an input shaft GW1 of a transmission G. The transmission G forms a powertrain unit of the powertrain. An output shaft GW2 of the transmission G is connected to a differential gear unit AG. The differential gear unit AG is adapted to distribute the power present at the output shaft GW2 to the drive wheels DW of the motor vehicle. The transmission G has a wheel set RS which, together with shift elements not shown in FIG. 1, is adapted to provide different transmission ratios between the input shaft GW1 and the output shaft GW2. The transmission G has an electric machine EM connected to the input shaft GW1. The electric machine EM is adapted to drive the input shaft GW.

Figure 2:
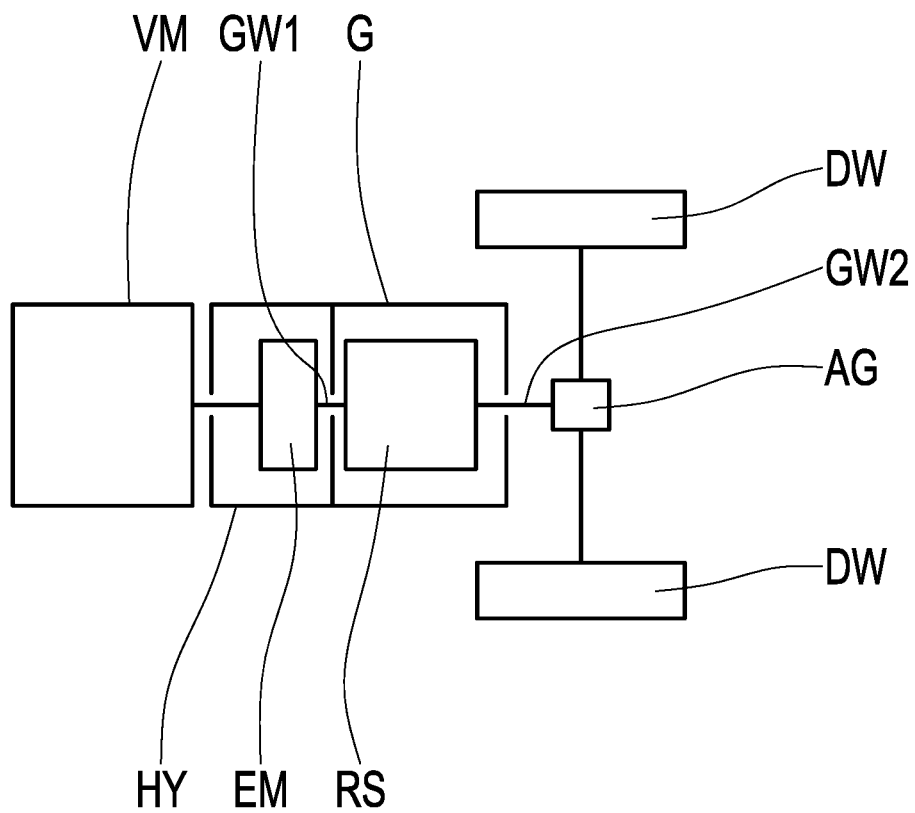

FIG. 2 schematically shows a powertrain in which there is no electric machine contained in the transmission G. Instead, a hybrid module HY is provided between the internal combustion engine VM and transmission G. The hybrid module HY has an electric machine EM.

Figure 3:
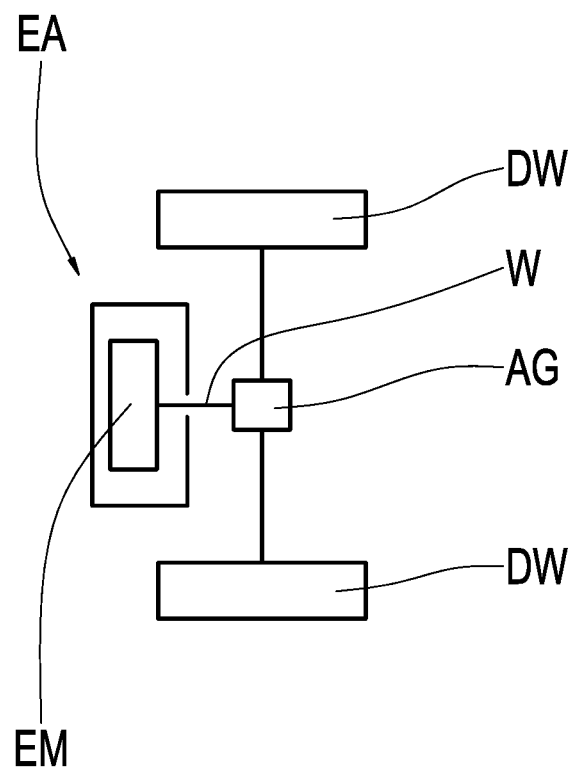

FIG. 3 schematically shows a powertrain for a motor vehicle which, in contrast to the construction shown in FIG. 1 and in FIG. 2, is an all-electric powertrain. The powertrain has a vehicle axle unit EA. The axle unit EA has an electric machine EM which is adapted to drive a shaft W. The shaft W is connected to a differential gear unit AG. The differential gear unit AG is adapted to distribute power present at shaft W to drive wheels DW of the motor vehicle.

The powertrains shown in FIG. 1 to FIG. 3 are to be considered as exemplary only. For example, the powertrains according to FIG. 1 and FIG. 2 could also be oriented transverse to the driving direction. The powertrain can serve to drive passenger vehicles, commercial vehicles, or railborne vehicles.

Figure 4:
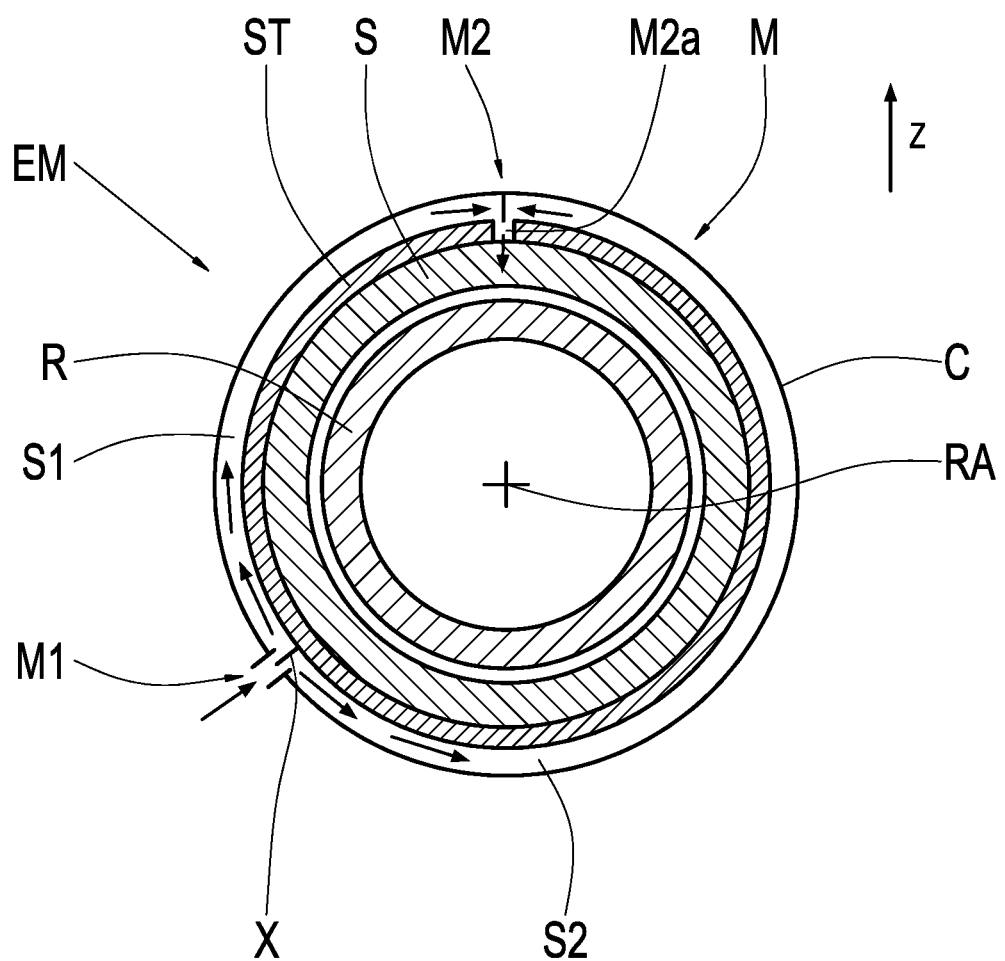
FIG. 4 and FIG. 5 each show a sectional view of an electrical machine.
Figure 5:
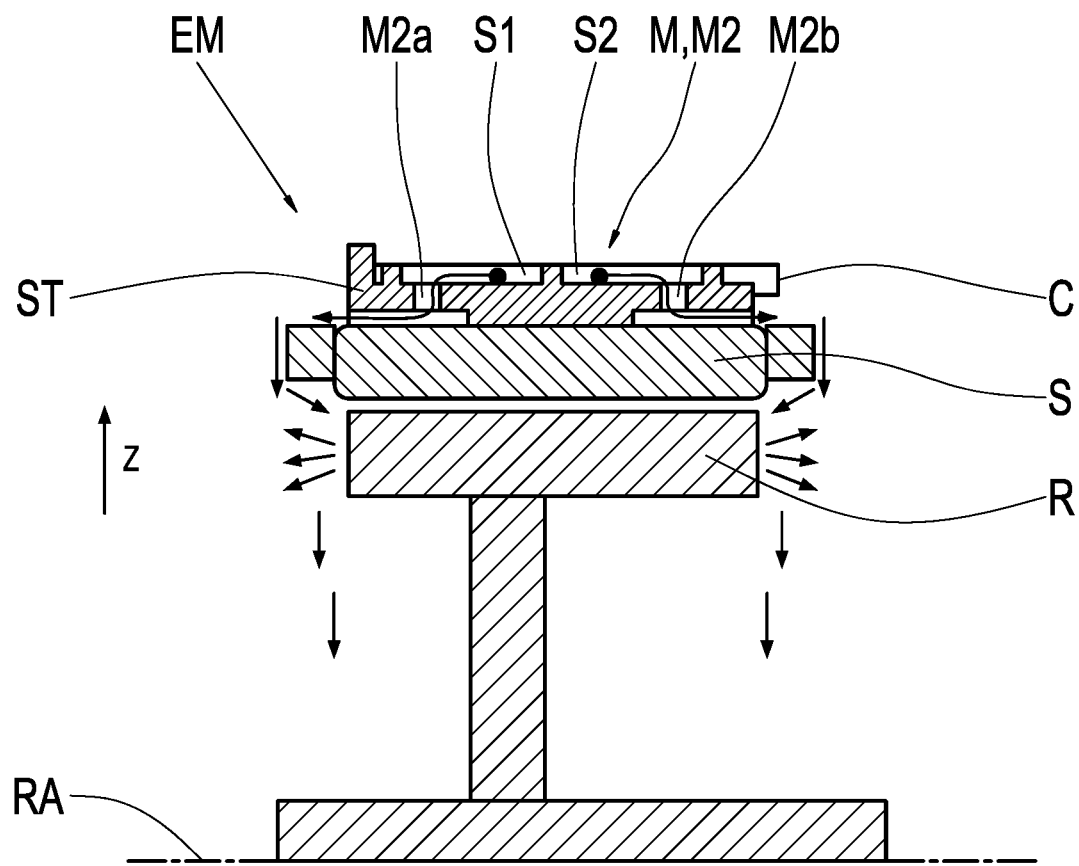

The use of a liquid cooling of the electric machine EM is advantageous for such applications, particularly in order to increase a maximum available continuous output thereof. FIG. 4 and FIG. 5 schematically show an arrangement of a liquid cooling of this kind.

FIG. 4 is a schematic sectional view of an electric machine EM with a stator S and a rotor R, wherein the section plane is arranged at a right angle to a rotational axis RA of the rotor R. The electric machine EM is an inrunner configuration, for example, that is, it is formed with a rotor R arranged radially inside of the stator S. However, the arrangement for liquid cooling described herein can also be applied with an outrunner configuration in which the rotor R is arranged radially outside of the stator S.

The electric machine EM is shown in the installed position, wherein the vertical line is illustrated by the directional arrow z. The stator S is held by a stator carrier ST. Stator carrier ST can be produced as a die cast aluminum part, for example. Stator S can be pressed into stator carrier ST. Stator carrier ST is surrounded by a cover element C, a gap being formed between an inner surface of the cover element C and an outer surface of stator carrier ST. The gap forms a cooling jacket M through which liquid cooling medium such as water or oil can flow. The cooling medium can absorb heat from stator carrier ST, which has been heated by stator S and can give off heat to the environment or to another cooling medium via a heat exchanger, not shown.

Cooling jacket M has an input M1 and an output M2. Input M1 is arranged spatially below the rotational axis RA, specifically in the lower fourth of the electric machine EM. Input M1 is deliberately arranged at a distance from the spatially lowest point of the electric machine EM so as not to increase installation height of the electric machine EM. Output M2 is arranged spatially above the rotational axis RA, specifically at the uppermost spatial point of the electric machine EM. Input M1 and output M2 are spaced apart by approximately one third of the circumference around stator carrier ST. Arrows illustrate the path of the cooling medium from input M1 to output M2.

Cooling jacket M has a first flow path S1 and a second flow path S2. Cooling medium flowing into input M1 is divided into the two flow paths S1, S2 by a dividing element X connected to the stator carrier ST. The two flow paths S1, S2 lead in circumferential direction to output M2. The first flow path S1 is shorter than the second flow path S2.

Output M2 is formed by an opening M2a formed in the stator carrier ST. Cooling medium exiting at opening M2a now flows downward at the electric machine EM propelled by gravitational force and collects in a sump area (not shown).

FIG. 5 is a further schematic sectional view of the electric machine EM in which output M2 is shown. The section plane is now formed by the rotational axis RA and by the vertical line z. The electric machine EM is shown in the installed position. Only the top half of the section is shown in FIG. 5 for better clarity. It can be seen clearly from FIG. 5 that each of the flow paths S1, S2 is assigned its own outlet opening M2a, M2b. Outlet openings M2a, M2b are axially spaced apart from one another. The cooling medium exiting from outlet openings M2a, M2b flows through a gap between stator carrier ST and stator S via the winding heads of stator S. The cooling medium flowing out in this way drips onto the rotor R. When rotor R rotates, the cooling medium is swirled and spun, which increases the thermal efficiency of the cooling arrangement to a significant degree. Finally, the cooling medium drips downward and is collected in a sump area (not shown).

When the cooling medium is oil, the dripping cooling medium can additionally be used for lubrication, for example, for lubrication of a rolling element bearing by means of which rotor R is supported relative to a transmission (not shown).

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. An arrangement for liquid cooling of an electric machine with a stator and a rotor, comprising:
a cooling jacket configured to enclose an outer circumference of the electric machine and having an input and an output, wherein the cooling jacket is further configured to guide a cooling medium that enters the cooling jacket at the input to the output,
wherein, in an installed position of the electric machine, the input is arranged spatially below a rotational axis of the rotor and circumferentially offset from a vertical plane through the rotational axis of the rotor, and the output is arranged spatially above the rotational axis.

2. The arrangement according to claim 1, wherein the output is arranged spatially at a substantially uppermost point of the electric machine in the installed position.

3. The arrangement according to claim 1, wherein, in the installed position of the electric machine,
the input is arranged spatially in at least one of a lower third the electric machine and a lower fourth of the electric machine, and
the input is arranged spatially at a distance from a lowermost point of the electric machine.

4. The arrangement according to claim 1, wherein input and output are arranged at a distance from one another of at least one of one fourth of the outer circumference of the electric machine and at least one third of the outer circumference of the electric machine.

5. The arrangement according to claim 1, wherein the cooling jacket is configured to guide cooling medium flowing into the cooling jacket from the input in both circumferential directions to the output.

6. The arrangement according to claim 5, wherein the cooling jacket comprises:
a first flow path that leads from the input in a first direction along the outer circumference of the electric machine to the output; and
a second flow path that leads from the input in a second direction opposite the first direction along the outer circumference of the electric machine to the output.

7. The arrangement according to claim 1, wherein the cooling jacket is formed by a stator carrier of the electric machine and a cover element that surrounds the stator carrier.

8. The arrangement according to claim 7, wherein the output is formed by at least one opening in the stator carrier.

9. The arrangement according to claim 7, further comprising:
a divider formed or arranged at the stator carrier and configured to divide the cooling medium entering the input.

10. An arrangement for liquid cooling of an electric machine with a stator and a rotor, comprising:
a cooling jacket configured to enclose an outer circumference of the electric machine and having an input and an output, wherein the cooling jacket is further configured to guide a cooling medium that enters the cooling jacket at the input to the output,
wherein, in an installed position of the electric machine, the input is arranged spatially below a rotational axis of the rotor, and the output is arranged spatially above the rotational axis,
wherein the cooling medium exiting from the output flows down outside of the cooling jacket at the electric machine.

11. An arrangement for liquid cooling of an electric machine with a stator and a rotor, comprising:
a cooling jacket configured to enclose an outer circumference of the electric machine and having an input and an output, wherein the cooling jacket is further configured to guide a cooling medium that enters the cooling jacket at the input to the output,
wherein, in an installed position of the electric machine, the input is arranged spatially below a rotational axis of the rotor, and the output is arranged spatially above the rotational axis,
wherein the output comprises at least two outlet openings arranged spaced apart from one another in an axial direction.

12. An arrangement for liquid cooling of an electric machine with a stator and a rotor, comprising:
a cooling jacket configured to enclose an outer circumference of the electric machine and having an input and an output, wherein the cooling jacket is further configured to guide a cooling medium that enters the cooling jacket at the input to the output, wherein the cooling jacket comprises:
a first flow path that leads from the input in a first direction along the outer circumference of the electric machine to the output; and
a second flow path that leads from the input in a second direction opposite the first direction along the outer circumference of the electric machine to the output,
wherein respective lengths of the first flow path and the second flow path are different.

13. An electric machine, comprising:
a stator;
a rotor; and
an arrangement for liquid cooling of the electric machine comprising:
a cooling jacket configured to enclose an outer circumference of the electric machine and having an input and an output, wherein the cooling jacket is further configured to guide a cooling medium that enters the cooling jacket at the input to the output,
wherein, in an installed position of the electric machine, the input is arranged spatially below a rotational axis of the rotor and circumferentially offset from a vertical plane through the rotational axis of the rotor, and the output is arranged spatially above the rotational axis.

14. A drive unit for a motor vehicle, comprising an electric machine configured to drive the motor vehicle, comprising:
a stator;
a rotor; and
an arrangement for liquid cooling of the electric machine comprising:
a cooling jacket configured to enclose an outer circumference of the electric machine and having an input and an output, wherein the cooling jacket is further configured to guide a cooling medium that enters the cooling jacket at the input to the output,
wherein, in an installed position of the electric machine, the input is arranged spatially below a rotational axis of the rotor, and the output is arranged spatially above the rotational axis,
wherein the drive unit is formed by one of:
a vehicle axle unit,
a transmission, or
a hybrid module arranged between an internal combustion engine and a transmission.

* * * * *